(12) United States Patent
Strandberg

(10) Patent No.: US 6,330,243 B1
(45) Date of Patent: Dec. 11, 2001

(54) SYSTEM AND METHOD FOR PROVIDING AN ELECTRONIC CHAT SESSION BETWEEN A DATA TERMINAL AND AN INFORMATION PROVIDER AT THE REQUEST OF AN INQUIRING PARTY INPUT INTO THE DATA TERMINAL

(75) Inventor: Malcom B. Strandberg, Cambridge, MA (US)

(73) Assignee: Davox Corporation, Westford, MA (US)

( * ) Notice: Subject to any disclaimer, the term of this patent is extended or adjusted under 35 U.S.C. 154(b) by 0 days.

(21) Appl. No.: 09/052,514

(22) Filed: Mar. 31, 1998

(51) Int. Cl.⁷ .................................................. H04L 12/28
(52) U.S. Cl. .......................................... 370/396; 709/204
(58) Field of Search ...................................... 370/352, 353, 370/355, 356, 396, 401, 270; 379/88.17, 88.19, 900; 345/330; 709/203, 204, 202, 205, 206, 217, 304, 250

(56) References Cited

U.S. PATENT DOCUMENTS

| | | | |
|---|---|---|---|
| 5,956,509 | * 9/1999 | Kevner | 709/304 |
| 5,958,014 | * 9/1999 | Cave | 709/229 |
| 5,974,409 | * 10/1999 | Sanu et al. | 707/3 |
| 5,987,503 | * 11/1999 | Murakami | 709/204 |
| 5,990,887 | * 11/1999 | Redpath et al. | 345/330 |
| 6,070,185 | * 5/2000 | Anupam et al. | 709/204 |
| 6,076,100 | * 6/2000 | Cottrille et al. | 709/203 |

\* cited by examiner

*Primary Examiner*—Wellington Chin
*Assistant Examiner*—Brenda H. Pham
(74) *Attorney, Agent, or Firm*—Bourque & Associates, P.A.

(57) ABSTRACT

A system and method for providing an electronic chat session between at least one inquiring party and at least one agent includes an inquiring party data terminal through which an inquiring party requests an electronic chat session with a call center agent over a data flow path that the inquiring party establishes with an information provider. A computer network and associated network interfaces, interface the inquiring party data terminal, the information provider server, and the electronic chat session distribution system to the computer network and allows data to be exchanged there between. A call center controller, responsive to a chat session request, generates a routing signal which establishes a data flow path between the inquiring party and at least one call center agent. The agent/inquiring party data flow path is an extension of the data flow path established between the inquiring party and the information provider and the data flow path established between the information provider and the call center allowing for the exchange of data between the inquiring party and a call center agent at the time the inquiry for information is made and without the need to establish another data flow path.

16 Claims, 4 Drawing Sheets

SYSTEM AND METHOD FOR PROVIDING AN ELECTRONIC CHAT SESSION BETWEEN A DATA TERMINAL AND AN INFORMATION PROVIDER AT THE REQUEST OF AN INQUIRING PARTY INPUT INTO THE DATA TERMINAL

FIELD OF THE INVENTION

The present invention relates to computer telephony systems and more particularly, to a system and method for providing and electronic chat session over a computer network at the request of an interested caller.

BACKGROUND OF THE INVENTION

Telephony call centers which place outbound calls and receive inbound calls typically utilize a telephone call center management system to help automate much of the process. The telephone call center management system controls, among other functions, the dialing of outbound telephone numbers from a predefined, sorted customer list having a number of customer call records within each customer call list. These customer call lists may be downloaded from a call record source, such as a host computer, to the telephone call center management system once during a 24 hour period, often during the non-busy early hours of the morning, or may be continuously and dynamically downloaded for dynamic updating of call records within a call list.

In the past, the overwhelming majority of customers, and potential customers, (collectively "inquiring parties") contacted the call center by telephone. These inquiring parties may be calling for many different reasons. For example, the inquiring parties may want information on the company's products and services, or may want information on their account. With the advent of large scale computer networks such as the Internet (also known as the World Wide Web), it is now possible for companies to provide product or service information on-line via a data terminal to its customers, or potential customers and likewise for inquiring parties to contact the call center over the computer network via their data terminals.

A company may provide information on-line about products, services, or accounts that an inquiring party is interested in, and provide a field for the inquiring party to provide a telephone number where they can be contacted for further information and follow-up. If the inquiring party is on-line when observing the information, the company has two very important pieces of information, namely: 1) the inquiring party is interested in this particular product, service, or information at this moment; and 2) there is an established communication link between the inquiring party and the information provider. Therefore the company would like to respond to this request immediately while the inquiring party is interested and the communication link is established.

As the usage of the Internet and World Wide Web increases, more and more individuals will contact companies having such call centers and will request information by entering textual information using data processing or data terminal equipment. At the moment, however, there are no automated systems which allow an individual to request and establish a real-time electronic chat session with an agent via the individual's data terminal in a call center managed method.

One problem associated with prior art systems of contacting inquiring parties who place information requests with companies on-line is that the data terminal or computer often accesses the internet or other type of computer network using the inquiring party's telephone line. An attempt to immediately place a telephone call to provide the requested information to the inquiring party would result in a "busy" signal, if the inquiring party is still "on line" with the internet. Thus a telephone call back must be made later at a less convenient time using an existing telephony system that is unable to efficiently schedule call backs, e.g. by having an agent manually call back or by automatically calling back and placing the party on hold. If the inquiring party needs assistance, e.g. with an account, a product, or the like, the existing systems are unable to provide that assistance at the time requested by the inquiring party.

Other methods of establishing communications between a call center and an inquiring party have been attempted in the past. One such method includes the use of voice over IP (information protocol) technology. However, this type of technology would only be useful to an inquiring party who has a computer configured to utilize the technology. This would typically require a computer with a fast processor and a sound card with voice input and output hardware. Additionally, some companies use the IRC (Internat Relay Chat) chat standard for customer support services. This allows a customer inquiring for support services to establish a real-time electronic chat session with a customer service representative at a support location. However, this type of electronic chat session is self managed. It is not managed by or integrated into a multi-function call center. In addition, customer service representatives using IRC chat standard communications links are not specially designated and selected from a plurality of call center agents, each of which may have specific cababilities especially useful for certain types of inquiries.

Accordingly, what is needed is an apparatus and method for providing an automatic and immediate electronic chat session between an inquiring party and a call center agent at the request of the inquiring party across a computer network data path that is established between the inquiring party and an information provider, which is extended to the call center agent so that the agent and inquiring party can communicate via an electronic chat session without requiring the inquiring party to establish or participate in a second data exchange flow path. Furthermore, what is needed is a system and method that allows a call center agent to handle multiple inquiries at a time and allows calls to be tracked and logged.

SUMMARY OF THE INVENTION

The present invention features a system and method for providing an electronic chat session between at least one inquiring party with an inquiring party and at least one agent at the request of the inquiring party. The system includes an inquiring party data terminal through which an inquiring party requests an electronic chat session with a call center agent over a data flow path that the inquiring party establishes with an information provider. The system also includes a computer network and associated network interfaces to interface the inquiring party data terminal, the information provider server, and the electronic chat session distribution system to the computer network and to allow data to be exchanged there between. Also included is a call center controller which in responsive to a chat session request, generates a routing signal, which establishes a data flow path between the inquiring party and at least one call center agent. The agent/inquiring party data flow path is an extension of the data flow path established between the inquiring party and the information provider and the data flow path established between the information provider and the call center. Therefore, the system utilizes the original data flow path established by the inquiring party and allows for the exchange of data between the inquiring party and a call center agent at the time the inquiry for information is made and without the need to establish another data flow path.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
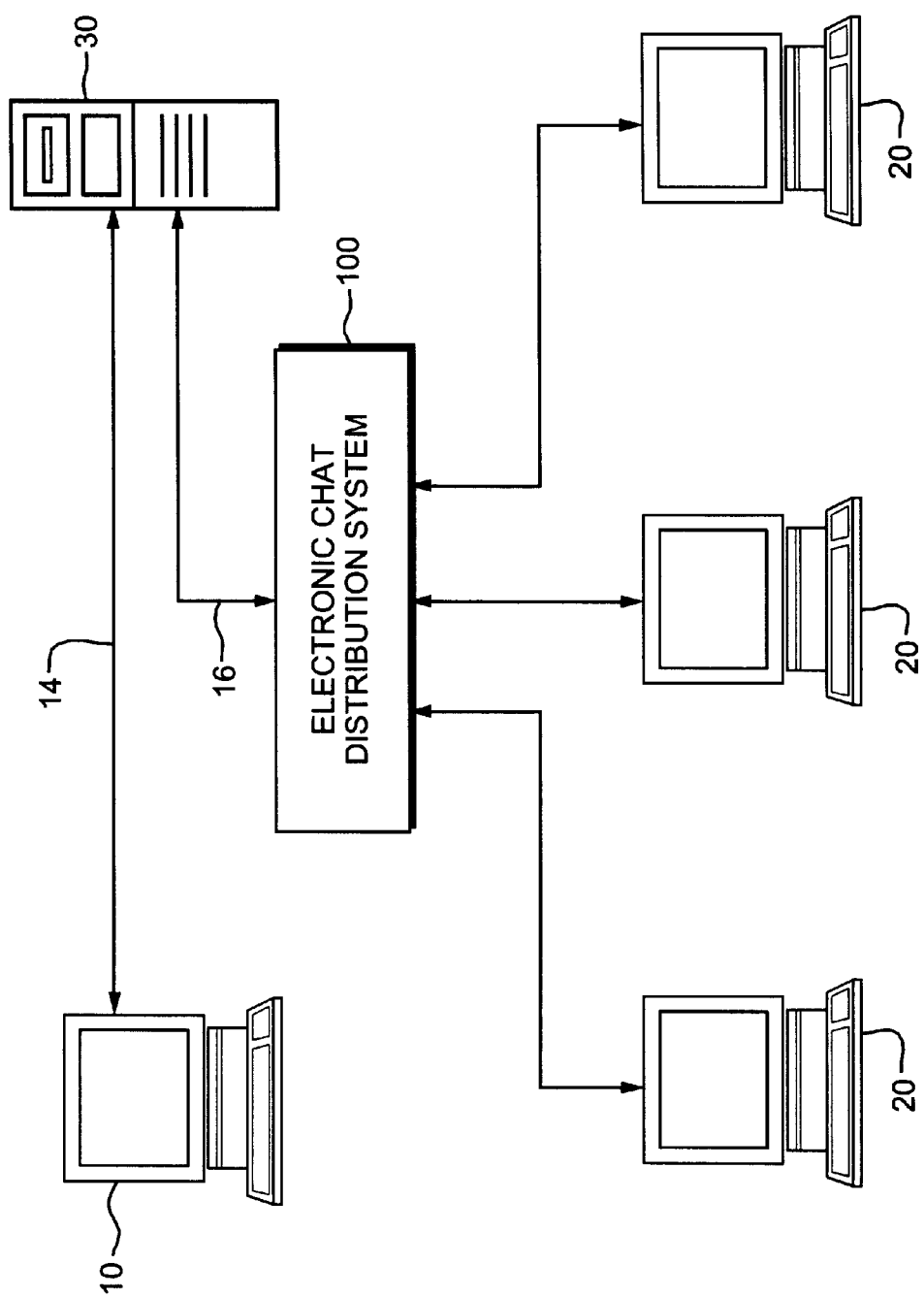
FIG. 1 is a schematic block diagram of the electronic chat session distribution system of the present invention.

The present invention features an electronic chat session distribution system 100, FIG. 1, for providing a real-time electronic chat session between an inquiring party and at least one agent at the request of the inquiring party, who enters an electronic chat session request at a data terminal 10. The data terminal 10 which is located at a first location, such as a user's residence, place of business, or public location (e.g., a mall), is used for entering and transmitting data over a first data path 14. The inquiring party at this location uses the data terminal 10 to inquire about information from an information provider 30, which could include, for example, information related to existing customer account information and product or service information. The data terminal 10, such as a PC, includes a keyboard or other mechanical input device, such as a mouse, and/or audio and video output devices, such as speakers and video displays.

In response to an electronic chat session request entered by the inquiring party at data terminal 10, the electronic chat session distribution system 100 can immediately initiate an electronic chat session between the inquiring party at the data terminal location and one or more agents located at agent data terminals 20 located at a remote location, such as a call center or the like. In one embodiment of the invention, the electronic chat session request would be directed to the product, service or account information provider 30, which could offer product, service or account information directly to the interested party data terminal via the data path established between the information provider and the interested party data terminal. Upon receipt of such an electronic chat session request, the information provider would establish a second data path 16 between the information provider and a call center and would forward the electronic chat session request to the call center for processing in accordance with the invention. One means by which the request could be forwarded would be via the global computer network using a network interface proximate the information provider. In addition to forwarding the electronic chat session request, the information provider would also forward sufficient information related to the topic of the electronic chat session to the electronic chat distribution system via data path 16 for ready access by an agent assigned to the electronic chat session. The information forwarded may be stored in a temporary storage buffer at the call center's electronic chat session distribution system so that it could be accessed by multiple agents if required during a single chat session or multiple, sequential chat sessions related to the same topic.

In the alternative, upon receipt of an electronic chat session request, the information provider could access the call center over a standard telephone line connection 115. In this embodiment, the information provider would use a modem (not shown) and dialer 117 to establish the telephone line connection between the information provider and the call center. In this embodiment of the invention, the inbound contact to the call center would be tagged as a highest priority incoming call and would be directed by the call center's automatic call distribution (ACD) 119 system to the first available agent in the manner disclosed in commonly owned U.S. Pat. No. 5,278,898, which is incorporated herein by reference. Additional features, such as a system for allocating agent resources, which is taught in commonly owned U.S. Pat. No. 5,592,543, and is incorporated herein by reference, could also be incorporated into the electronic chat distribution system disclosed herein to insure maximum utilization of call center resources, promote overall efficiency of call center operations and ensure a high level of customer satisfaction.

In a further embodiment of the invention, the information provider and call center could be co-located. This embodiment could involve, for example, a mail order or catalog-based merchandiser, which provides an electronic catalog that can be accessed via the global computer network or direct dial-up telephone links by interested party data terminals. In this embodiment, the electronic chat session distribution system would be linked to the information provider via a local area network (LAN) or a wide area network (WAN).

Once the electronic chat session distribution system receives both the electronic chat session request and the information related to the subject matter of the electronic chat session, it will assign at least one agent to the electronic chat session and establish communications with data terminal 10 via established data paths 14 and 16.

The data paths 14 and 16 between the inquiring party data terminal 10, the information provider 30 electronic chat session distribution system 100 can include one or more types of data paths. One type of data path is a direct data path, such as a direct dedicated telephone line or a local area network line, such as an ethernet or token ring. This type of direct data path is used, for example, when the data terminal 10 is installed in a shopping mall or other public area as a means of advertising to, and collecting data from, an inquiry party. In this example, a real-time electronic chat session can be established between the data terminal 10 and the information provider 30 at the request of the inquiring party while the inquiring party is at the terminal 10.

Figure 2:
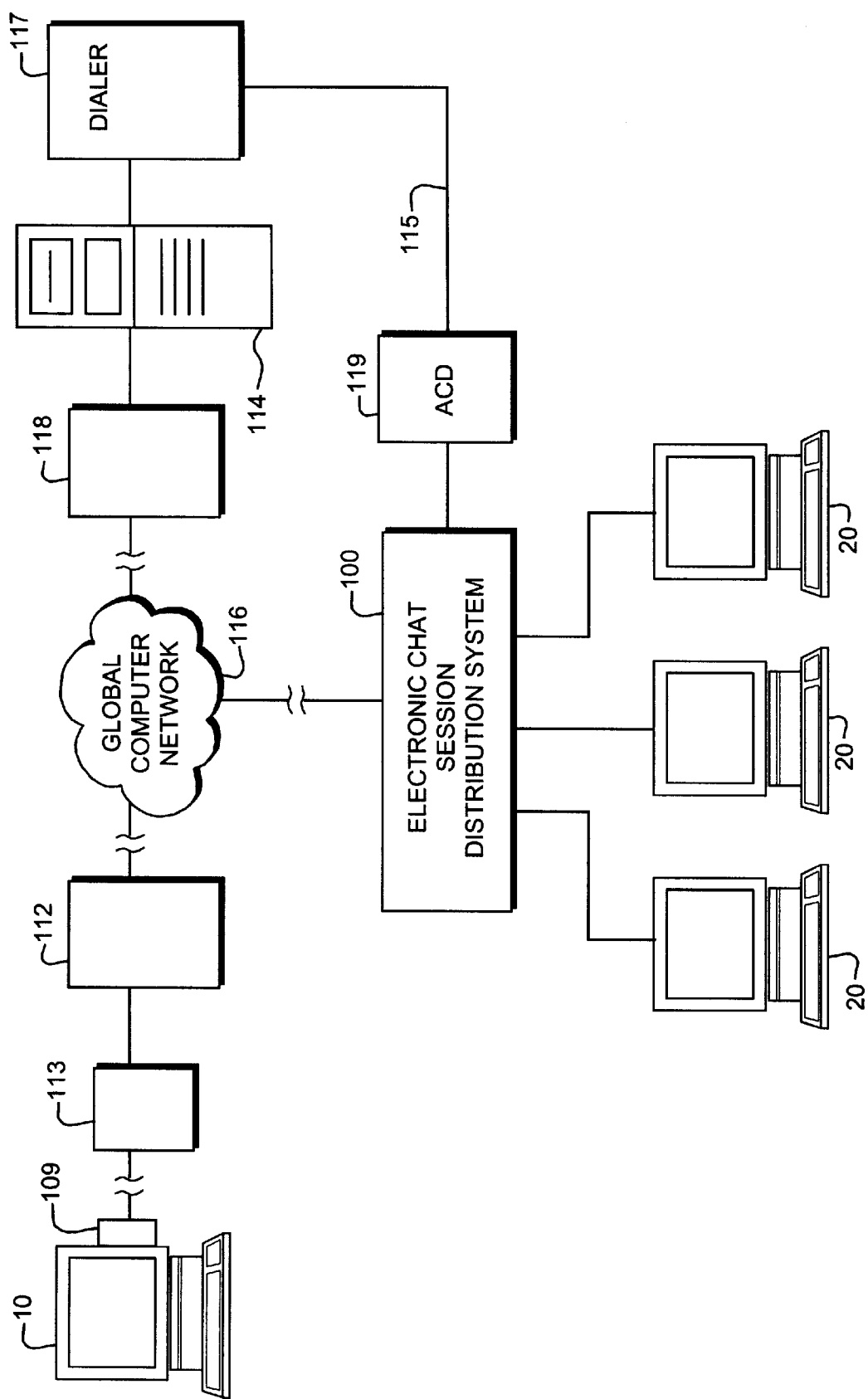
FIG. 2 is a schematic block diagram of an embodiment of the system of the present invention, which uses a wide scale computer network as the data flow path.

Another type of data path is a computer network 116, which may be provided through the Internet/World Wide Web or other type of large scale or global information network. This type of data path is shown in FIG. 2. In this example, the data terminal 10 is connected (remotely or directly) to a first data server 112. The first data server 112 is typically maintained by an Internet service provider and is accessed via a modem 109, which is either incorporated in or coupled to data terminal 10 and a telephone line 111 connected to the first data server 112, for example, through the Public Telephone Network (PTN) 113. The first data server 112 then interfaces across the Internet-World Wide Web 116 to a second data server 114 which is maintained by an information provider and which provides information to the inquiring party over the data path via data path interface 118.

One example of the information provider server 114 includes a computer, generating data to create a Web-page. The second data server 114 transmits the data across the datapath 116, such as the Internet-World Wide Web to the first data server 112 and to the data terminal 10. The data terminal 10 responds to the data sent by the data server 114 and displays a user interface based on this data. This data is typically a Hyper Text Markup Language (HTML) file that is interpreted by the data terminal 10.

As is well known in the art, the user interface displayed on the data terminal, commonly known as a Web-page, can include text, graphics, pictures, audio, and data (text) entry fields. The creation of data entry fields and the transmission of data by the data terminal 10 is performed typically by a CGI script or a JAVA language program, which allows data entered into a data entry field to be sent to and stored in particular locations at the information provider server 114.

The data entry fields are designed to elicit responses to requests for information from the inquiring parties, as is well known in the art. Such requests can include the inquiring party's name, telephone number, address, account information, the information the inquiring party desires, inquiries into particular products or services, or any other information useful for sales and/or marketing purposes. In addition, one data entry field of particular concern to the disclosed invention is a field where the inquiring party can indicate that the inquiring party desires to initiate an electronic chat session with an agent or other representative regarding a particular topic of information provided by the information provider. In one embodiment of the invention, this could include an area on the data terminal display where the inquiring part would place his or her input device cursor and select, such as a "click on icon".

In another embodiment, a large scale computer network 116, such as the Internet, can be used as an audio path to transmit audio signals in addition to information data. In this embodiment, the data path interface 118 can provide either a graphical user interface and/or an audio interface for its customers and potential customers. Customers, or potential customers, can respond to the user interface with any of several current voice over the Internet packages. Examples of such systems include Webcall, Netmeeting, CU-See Me, and Cooltalk.

The present invention contemplates using other types of data paths or transmission media including other types of local area networks, wide area networks, or global information networks.

Figure 3:
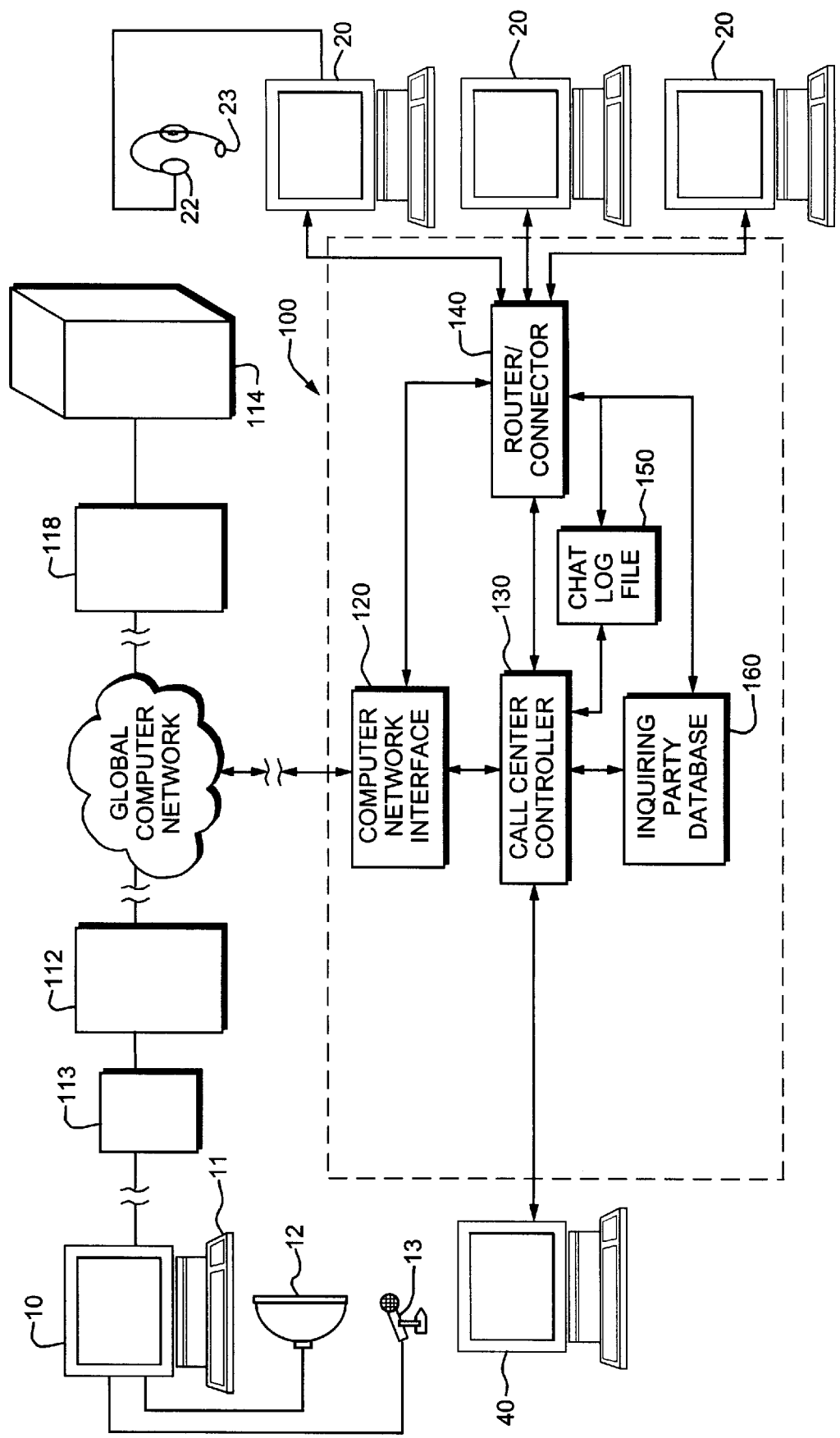
FIG. 3 is a schematic block diagram of the system of the present invention showing the components of the electronic chat session distribution system of FIG. 2.

Turning now to FIG. 3, an embodiment of an electronic chat session distribution system 100, which distributes at least one inquiring party with an inquiring party data terminal 10 who requests an electronic chat session over a computer network among a plurality of agents and their associated agent data terminals is shown. In this embodiment of the invention, data terminal 10 accesses computer network 116 through a first data server 112, which acts as a computer network interface to link the inquiring party data terminal to computer network 116, which may, for example, be the Internet/World Wide Web or other large scale computer network. The inquiring party data terminal will then access an information provider server 114, which is linked to the computer network through data path interface 118, which enables "seamless" communications between the inquiring party data terminal 10 and the information provider server 114. The inquiring party would thus be able to browse the information provided by the information provider server locally at the inquiring party data terminal 10.

If the inquiring party comes upon information of particular interest to the inquiring party or for some other reason wishes to establish an electronic chat session with an agent or representative related to the information of interest, the inquiring party would initiate an electronic chat session request at the inquiring party data terminal 10. The request would then be routed to the information provider server 114 via computer network 116. Upon receipt of the electronic chat session request, the information provider server would forward the request to the electronic chat session distribution system 100 via data path interface 118 and computer network 116. In addition, to forwarding the electronic chat session request, the information provider server would also forward information relevant to the topic of the requested electronic chat session, which may be in the form of a chat session script, to the electronic chat session distribution system 100.

Like the inquiring party data terminal and the information provider server, electronic chat session distribution system 100 interfaces with computer network 116 through a computer network interface 120. In the preferred embodiment, network interface 120 would be incorporated into the electronic chat distribution system 100, as shown in FIG. 3, since, for all practical purposes the electronic chat distribution system would maintain a continuous data path connection with the computer network 116 to allow for real-time communications with any number of information provider servers.

The heart of the electronic chat distribution system 100 is a call center controller 130, which receives the electronic chat session request and the electronic chat session information and interfaces with a router/connector 140 to route the received electronic chat session information to one or more selected agent data terminals 20 and to connect the selected agent data terminal or terminals to the inquiring party data terminal 10 via computer network 116 to establish the electronic chat session between the agent and agents and the inquiring party.

Once the electronic chat session is established, information may be passed between the inquiring party and the agent or agents. In this regard, information entered by the inquiring party at his or her data terminal will be repeated at the connected agent data terminal or terminals. Likewise, information entered by the agent or agents at his, her of their data terminal(s) will be repeated at the inquiring party's data terminal. In one embodiment of the invention, the information entered by the inquiring party will be input as a sequence of keystrokes on the inquiring party's data terminal keyboard 11, which will generate textual information, that will in turn appear on the agent data terminal's display device. The agent would then respond to the displayed information in the form of a keystroke sequence entered into his or her data terminal keyboard 21.

An alternative embodiment would provide a semi-friendly mode of operation. In this embodiment, an inquiring party would input his or her information request as a keystroke sequence on keyboard 11 which would be repeated on the agent data terminal display. However, instead of responding in like kind, the agent would speak his or her response into an agent data terminal audio input device 23. The agent data terminal would then compress and transmit the spoken response to the inquiring party data terminal where it would be played as a standard web audio file and be output on an audio output device 12, such as a speaker, at the inquiring party data terminal. This embodiment would facilitate and perhaps speed up agent responses since an agent would not be required to type a response into his or her agent data terminal keyboard 21. In addition, since the response would be transmitted to the inquiring party as a standard web audio file, it would be available for replay by the inquiring party if desired. Furthermore, the principles of the invention can be used in conjunction with well known inquiring party audio input devices 13, such as microphones, which would accept audio inputs, which would be repeated at an audio output device 22 at the assigned agent or agents terminal(s).

However, the preferred embodiment would utilize inquiries made using input keyboard 11, and either keystroke or spoken agent responses since these embodiments would allow a single agent to be simultaneously engaged in more than one electronic chat session. This could be implemented using a windowing strategy on the agent data terminal, which would allow an agent to select any one of the active electronic chat session windows and input a response when a response would be due to an inquiring party. Furthermore, in either of the preferred embodiments, the electronic chat session distribution system could include a chat log file 150 interfaced with the router/connector and call center controller for storing both incoming and outgoing electronic chat session communications for future reference, which may be desirable for training, tracking and agent evaluation purposes.

The electronic chat session distribution system could also include an inquiring party database 160 which would be built by routing selected electronic chat session communications to the inquiring party database. Both the inquiring party database 160 and the chat log file 150 would be available to a system supervisor who would monitor, supervise, and/or control certain parameters of the system from a supervisor workstation 40.

Figure 4:
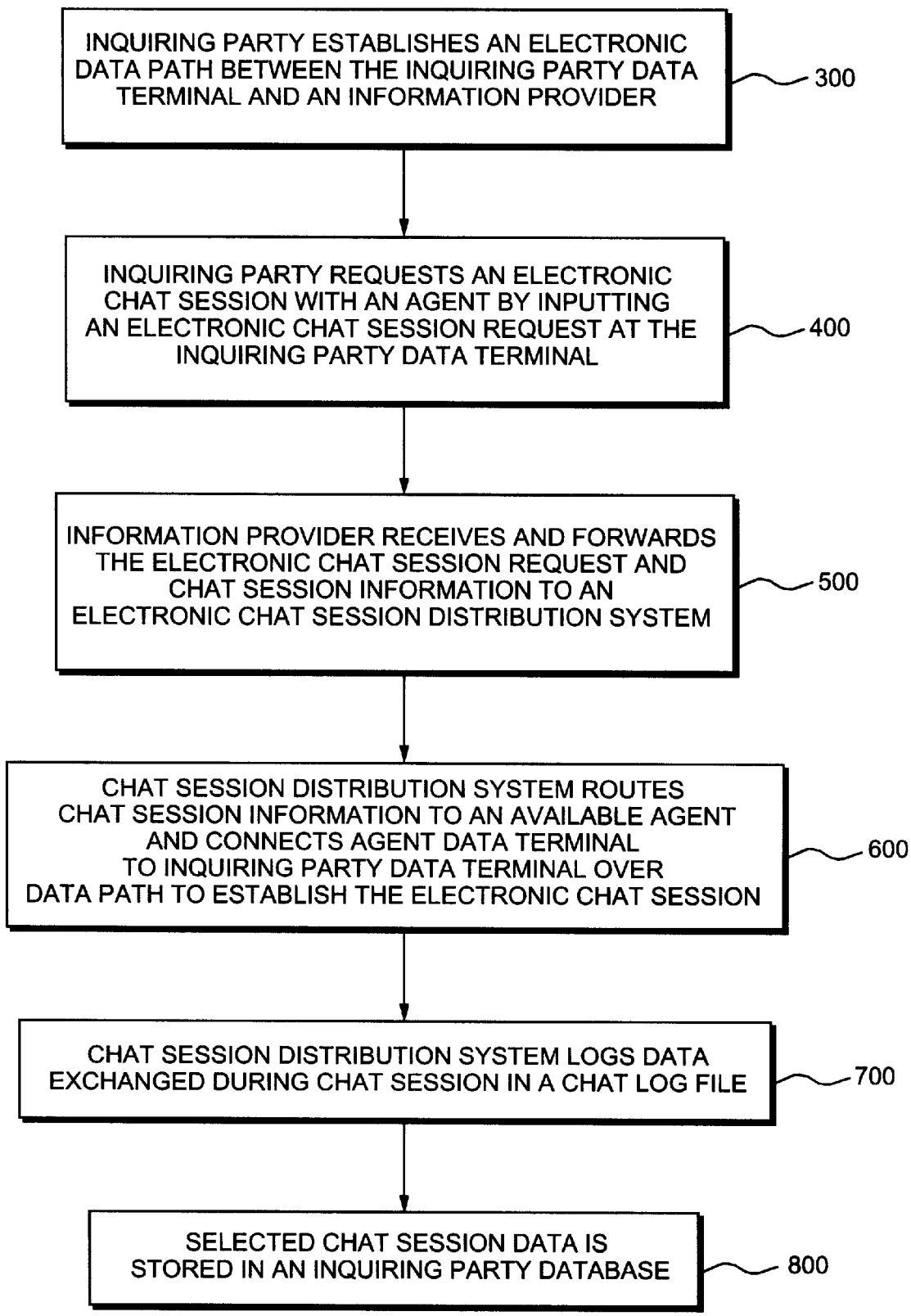
FIG. 4 is a flow chart showing the steps of the method of the present invention.

The present invention also includes a method for providing an electronic chat session between an agent and an inquiring party responsive to an electronic chat request input by the inquiring party at an inquiring party data terminal. A flow chart of the steps of the method are shown in FIG. 4. An inquiring party first establishes an electronic data path between an inquiring party data terminal and an information provider server, step 300. A common example is an individual who, using his or her home computer, contacts a particular web site on the Internet/World Wide Web, where the individual can browse product, service or other information on the web site.

The second step, step 400, requires the inquiring party to request an electronic chat session with an agent or representative in order, for example, to acquire additional information about a specific product or service. The inquiring party would initiate the request by, for example, "clicking" an input device on a "chat request" icon on the web page. Once an electronic chat session is requested, the information provider will forward the request and relevant chat session information to an electronic chat session distribution system, step 500.

Upon receipt of an electronic chat session request and the associated chat session information, the electronic chat session distribution system routes the chat session information to an available agent and connects the agent data terminal to the inquiring party over a data path to establish an electronic chat session, step 600. The assigned agent would then communicate, in real-time, with the inquiring party in chat mode to answer any questions that the inquiring party may have or provide additional information to the inquiring party.

The chat session may take a number of forms and utilize different technologies. However, the common thread for the different chat session forms is that the data exchange between the inquiring party and the agent would take place, in whole or in part, over the data flow path initially established by the inquiring party so that the chat session is a) immediate and b) does not require a separate communications link to the inquiring party, such as, for example, a telephone call. One form that the chat session could take is a keyboard entered data exchange. In this type of session, the information typed by an inquiring party would be repeated on a display device at the agent data terminal and vice-versa. A second for of electronic chat session would require keyboard initiated data entries on the part of the inquiring party, which would be repeated on the agent's data terminal display. However, instead of entering a response on his or her keyboard, the agent would speak a response into a data terminal audio input, such as a microphone, which would be transmitted to the inquiring party over the data flow path as a web audio file, which would provide and audio response to the inquiring party. In either embodiment a multi-window agent data terminal display would allow a single agent to engage in multiple electronic chat sessions simultaneously. At the same time, the same agent could also engage in one telephone (voice) call.

The next step in the method is for the electronic chat session distribution system to log all of the information exchanged between the inquiring party and the agent in a chat log file, step 700, for recall at a later date for tracking, reporting, or evaluation purposes. Finally, selected chat session information, such as an inquiring party is name, address, telephone number could be stored in a separate inquiring party database, step 800. The inquiring party database may be sorted by product or service information provider. This would allow information providers to have a record of those individuals who inquired further, via an electronic chat session, about their products or services, which would indicate that the individual is truly interested in a particular product or service.

The invention may be implemented using a variety of mechanisms. One such mechanism includes a CGI (computer generated interface) web page. Such a page would include a form section where an inquiring party may input an inquiry. The inquiry can then be directed, as previously described, to an available agent who would either provide the desired information via an agent's reply text form or via an audio file. Another implementation mechanism includes a Java applet running on a web page. This implementation mechanism would allow a live, live by line or character by character scrolling text box to be used to convey information between an agent and an inquiring party. The Java applet could provide an audio output stream, which would be played at the inquiring party's data terminal. Furthermore, the applet could include an autodetect function to determine if an inquiring party's data terminal is audio enabled. This would allow an agent to immediately determine which communication mechanism is appropriate for responding to a particular inquiring party.

The previously described, illustrated embodiments of the invention provide significant advances over the prior art, and most significantly allows an inquiring party, such as a potential customer, to access a company's information on-line and establish an immediate electronic chat session with an agent or representative of that company over the same data path established by the inquiring party to access the company's information. This allows a user of the present invention to immediately communicate electronically with an inquiring party when there is a current need for information and an established data flow path.

Modifications and substitutions by one of ordinary skill in the art are considered to be within the scope of the present invention which is not to be limited except by the claims which follow.

What is claimed is:

1. A system for distributing at least one inquiring party with an inquiring party data terminal requesting an electronic chat session over a data flow path established between said inquiring party data terminal and an information provider, among a plurality of agents having associated agent data terminals which comprise an agent display and at least one agent data entry device, said system comprising:

a computer network interface for interfacing with said at least one inquiring party, for generating an electronic chat session request, for extending said established data flow path to a call center, and for forwarding said request to a call center;

a call center controller, responsive to said electronic chat session request, for generating a routing signal; and a router/connector responsive to said electronic chat session request and responsive to said routing signal, for extending said established data flow path between said at least one inquiring party requesting an electronic chat and at least one agent; whereby information may be passed electronically between said at least one interested party and said at least one agent, and whereby information input by said at least one inquiring party is repeated at said agent data terminal and information input by said at least one agent using said agent data entry device is repeated at said inquiring party data terminal.

2. The system as claimed in claim 1, further comprising a chat log file, for storing each communication between said at least one inquiring party and said at least one agent.

3. The system as claimed in claim 2 further comprising an inquiring party database including at least one record of information concerning an inquiring party.

4. The system as claimed in claim 1, wherein said data flow path includes a TCP/IP network.

5. The system as claimed in claimed 1, wherein said user interface includes an Internet-World Wide Web home page.

6. The system as claimed in claim 1, wherein said electronic chat session request generated by said user interface is a Hyper Text Markup Language link.

7. A system for distributing at least one inquiring party with an inquiring party data terminal requesting an electronic chat session over a computer network, among a plurality of agents having associated agent data terminals, which include an agent display and at least one data entry device, said system comprising:

a computer network interface for interfacing said at least one inquiring party data terminal with an information provider via a first data path over said computer network and for generating an electronic chat session request;

a second data path for interfacing said information provider with an electronic chat session distribution system for forwarding said electronic chat session request and information related to the request to said electronic chat distribution system, wherein said electronic chat session distribution system comprises:

a computer network interface for interfacing with said computer network, a call center controller responsive to said electronic chat session request for generating a routing signal, and a router/connector responsive to said electronic chat session request and responsive to said routing signal for establishing a data flow path between said at least one inquiring party and at least one agent, said data flow path comprising said first data path and said second data path, whereby information may be passed electronically between said at least one inquiring party and said at least one agent and whereby information input by said at least one inquiring party is repeated at said agent data terminal and information input by said at least one agent into said agent data entry device is repeated at said inquiring party data terminal.

8. The system as claimed in claim 7 wherein said electronic chat session distribution system further comprises a chat log file for storing each communication between said at least one inquiring party and said at least one agent.

9. The system as claimed in claim 8, wherein said electronic chat session distribution system further comprises an inquiring party database including at least one record of information concerning an inquiring party.

10. The system as claimed in claim 7 wherein said at least one agent data entry device comprises a keyboard.

11. The system as claimed in claim 7 wherein said at least one agent data entry device is an audio input device for inputting information spoken by said at least one agent.

12. The system as claimed in claim 7 wherein said agent data terminal comprises a windowing program to allow an agent to simultaneously participate in multiple electronic chat sessions.

13. The system as claimed in claim 7 wherein said electronic chat session distribution further comprises a supervisor workstation for monitoring the system and at least one electronic chat session.

14. A method of distributing at least one inquiring party with an inquiring party data terminal requesting an electronic chat session over a data flow path, among a plurality of agents having agent data terminals, which comprise an agent display and at least one agent data input device, said method comprising the steps of:

establishing a first data flow path between said inquiring party data terminal and an information provider;

initiating an electronic chat session request by inputting said request at said inquiring party data terminal;

receiving said chat session request and forwarding said request and chat session information by said information provider to an electronic chat session distribution system over a second data flow path;

routing said chat session request and said chat session information to an available agent and connecting said agent data terminal to said inquiring party data terminal using said established first and second data flow paths to establish an electronic chat session; and exchanging data between said agent and said inquiring party.

15. The method as claimed in claim 14, further comprising the step of logging said exchange data in a chat log file.

16. The method as claimed in claim 14, further comprising the step of storing selected chat session exchanged data in an inquiring party database.

* * * * *